United States Patent
Otoguro et al.

(10) Patent No.: US 10,836,434 B2
(45) Date of Patent: Nov. 17, 2020

(54) VEHICLE FRONT STRUCTURE

(71) Applicant: Toyota Jidosha Kabushiki Kaisha, Toyota (JP)

(72) Inventors: Kazuma Otoguro, Toyota (JP); Jumpei Nishide, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 221 days.

(21) Appl. No.: 16/160,382

(22) Filed: Oct. 15, 2018

(65) Prior Publication Data

US 2019/0152529 A1 May 23, 2019

(30) Foreign Application Priority Data

Nov. 21, 2017 (JP) .................................. 2017-223291

(51) Int. Cl.
| | | |
|---|---|---|
| B62D 25/02 | (2006.01) | |
| B62D 21/15 | (2006.01) | |
| B62D 27/02 | (2006.01) | |
| B62D 29/00 | (2006.01) | |
| B62D 25/20 | (2006.01) | |
| B62D 25/04 | (2006.01) | |
| B62D 25/08 | (2006.01) | |

(52) U.S. Cl.
CPC ......... *B62D 21/152* (2013.01); *B62D 25/025* (2013.01); *B62D 25/04* (2013.01); *B62D 25/08* (2013.01); *B62D 25/2018* (2013.01); *B62D 27/023* (2013.01); *B62D 29/007* (2013.01); *B60Y 2306/01* (2013.01)

(58) Field of Classification Search
CPC .... B62D 21/152; B62D 25/025; B62D 25/04; B62D 25/08; B62D 25/2018; B62D 27/023; B62D 29/007; B62D 2306/01
USPC ...................................................... 296/187.09
See application file for complete search history.

(56) References Cited

U.S. PATENT DOCUMENTS

| | | | | |
|---|---|---|---|---|
| 6,053,564 A | * | 4/2000 | Kamata ................ | B62D 21/152 296/187.09 |
| 8,371,643 B2 | * | 2/2013 | Itakura .................. | B62D 25/02 296/203.03 |

(Continued)

FOREIGN PATENT DOCUMENTS

| | | | | |
|---|---|---|---|---|
| JP | 56039920 A | * | 4/1981 | ............ B60J 5/0477 |
| JP | 2011-136593 A | | 7/2011 | |

(Continued)

*Primary Examiner* — Hilary L Gutman
(74) *Attorney, Agent, or Firm* — Dinsmore & Shohl LLP

(57) ABSTRACT

A vehicle front structure includes: a rocker outer constituted by a high tensile steel material and extending in a vehicle front-rear direction, the rocker outer including a first upper flange portion; a rocker inner constituted by a high tensile steel material and extending in the vehicle front-rear direction, the rocker inner including a second upper flange portion; a front pillar inner extending in a vehicle up-down direction being sandwiched between the rocker outer and the rocker inner; and a bracket joined to the first upper flange portion with a weld nut being fixed to the bracket. The first upper flange portion and the second upper flange portion are bolted together such that a bolt is inserted, from inside in the vehicle width direction, into respective boles provided in the second upper flange portion, the front pillar inner, and the first upper flange portion.

7 Claims, 3 Drawing Sheets

(56) References Cited

U.S. PATENT DOCUMENTS

| | | | | |
|---|---|---|---|---|
| 2008/0084093 A1* | 4/2008 | Kishima | ................ | B62D 24/02 |
| | | | | 296/203.03 |
| 2012/0248825 A1* | 10/2012 | Tamura | ................ | B62D 25/04 |
| | | | | 296/209 |
| 2013/0187406 A1* | 7/2013 | Torii | ................ | B62D 21/15 |
| | | | | 296/187.12 |
| 2013/0207418 A1* | 8/2013 | Suzaki | ................ | B62D 25/2036 |
| | | | | 296/209 |
| 2015/0175218 A1* | 6/2015 | Yoshioka | ................ | B62D 25/025 |
| | | | | 296/203.01 |
| 2016/0194034 A1* | 7/2016 | Emura | ................ | B62D 25/04 |
| | | | | 296/209 |
| 2016/0325786 A1* | 11/2016 | Elfwing | ................ | B62D 29/008 |
| 2017/0203792 A1* | 7/2017 | Sunohara | ................ | B62D 21/157 |
| 2019/0009824 A1* | 1/2019 | Watanabe | ................ | B62D 25/025 |
| 2019/0047636 A1* | 2/2019 | Asa | ................ | B62D 27/02 |
| 2020/0114973 A1* | 4/2020 | Takahashi | ................ | B62D 25/025 |
| 2020/0148272 A1* | 5/2020 | Leblanc | ................ | B62D 25/04 |
| 2020/0148277 A1* | 5/2020 | Leblanc | ................ | B62D 27/02 |

FOREIGN PATENT DOCUMENTS

| | | | | |
|---|---|---|---|---|
| JP | 2015-123811 A | | 7/2015 | |
| JP | 2017043137 A | * | 3/2017 | ........... B62D 25/025 |
| JP | 2017193292 A | * | 10/2017 | |

\* cited by examiner

VEHICLE FRONT STRUCTURE

CROSS-REFERENCE TO RELATED APPLICATIONS

This application claims priority to Japanese Patent Application No. 2017-223291 filed on Nov. 21, 2017, which is incorporated herein by reference in its entirety including the specification, drawings and abstract.

BACKGROUND

1. Technical Field

The disclosure relates to a vehicle front structure.

2. Description of Related Art

In a vehicle front structure, a connection portion between respective front end portions of a rocker outer and a rocker inner in the vehicle front-rear direction highly contributes to performance to maintain an opening shape of a front door as one of the performance indexes in a front end collision (particularly, a small overlap front end collision) of a vehicle and therefore, a structure that can improve connection strength is required for the connection portion. In the related art, spot welding and arc welding are used together for the connection portion between the front end portions of the rocker outer and tint rocker inner in the vehicle front-rear direction within the restriction of production engineering requirements. However, as a high tensile steel material has been used for a sheet-metal part in consideration of a further reduction in vehicle mass in recent years, a weak portion is the connection portion between the front end portions of the rocker outer and the rocker inner in the vehicle front-rear direction, so that a structure having a further higher robustness has been required for such a connection portion.

Japanese Unexamined Patent Application Publication No. 2011-136593 (JP 2011-116593 A) describes a vehicle front structure configured such that a lower end portion of a front pillar inner is sandwiched and welded between a rocker outer and a rocker inner and a side member outer that is a design member is placed outside the rocker outer in the vehicle width direction.

In the vehicle front structure of the publication, the front pillar inner extends upward from between the rocker outer and the rocker inner. Accordingly, at the time of performing spot welding to weld the rocker outer to the rocker inner, the spot welding may not be performed on some parts because a spot gun used for the spot welding does not reach those parts because of the front pillar inner.

It is considered that a part that cannot be subjected to the spot welding because the spot gun does not reach the part is connected by use of bolt and nut. However, in a state where the side member outer is placed outside the rocker outer in the vehicle width direction, a bolt cannot be tightened from outside in the vehicle width direction. Accordingly, it is necessary to fix a weld nut to the rocker outer and to tighten a bolt from inside in the vehicle width direction. However, in a case where the rocker outer is made of a high tensile steel material, the weld nut can hardly melt into the rocker outer, and therefore, it is, difficult to fix the weld nut to the rocker outer.

SUMMARY

The present disclosure provides a vehicle front structure that can fix a weld nut to a rocker outer even if the rocker outer is made of a high tensile steel material.

A vehicle front structure according to an aspect of the disclosure includes: a rocker outer constituted by a high tensile steel material and extending in a vehicle front-rear direction, the rocker outer including a first upper flange portion; a rocker inner constituted by a high tensile steel material and extending in the vehicle front-rear direction, the rocker inner including a second upper flange portion; a front pillar inner extending in a vehicle up-down direction and placed so as to be sandwiched between the rocker outer and the rocker inner; a side member outer placed outward of the rocker outer in a vehicle width direction; and a bracket joined to the first upper flange portion with a weld nut being fixed to the bracket. The first upper flange portion and the second upper flange portion are bolted together at a first bolting part such that a bolt is inserted, from inside in the vehicle width direction, into respective holes provided in the second upper flange portion, the front pillar inner, and the first upper flange portion and is engaged with the weld nut.

In the vehicle front structure according to the aspect, the weld nut is not directly fixed to the rocker outer, but the weld nut is fixed thereto via the bracket. Accordingly, it is not necessary to directly weld the weld nut to the rocker outer. Accordingly, even in a case where the rocker outer is constituted by a high tensile steel material, when the bracket is set to have an intermediate property between the rocker outer and the weld nut in terms of tensile strength and melting temperature, it is possible to weld the weld nut to the bracket and to weld the bracket to the rocker outer, so that the weld nut can be fixed to the rocker outer. As a result, in a state where the side member outer is placed outward of the rocker outer in the vehicle width direction, the bolt can be tightened to the weld nut fixed to the rocker outer, from inside in the vehicle width direction. Accordingly, even at a part that cannot be subjected to spot welding because a spot gun cannot reach the part due to the front pillar inner, the upper flange portion of the rocker outer and the upper flange portion of the rocker inner can be bolted together, thereby making it possible to improve connection strength between the rocker outer and the rocker inner.

In the above aspect, the first upper flange portion and the second upper flange portion may be bolted at a second bolting part which differs in position in the vehicle front-rear direction from the first bolting part.

According to the above configuration, the bolting is performed at the bolting parts. Accordingly, in comparison with a case where the bolting is performed only at one bolting part, the number of bolting parts is increased and it is possible to restrain relative rotation between the rocker outer and the rocker inner. Consequently, it is possible to improve connection strength between the upper flange portion of the rocker outer and the upper flange portion of the rocker inner. Further, the bolting parts are provided in the vehicle front-rear direction. This is advantageous to improve the connection strength between the rocker outer and the rocker inner extending in the vehicle front-rear direction, in comparison with a case where the bolting parts are provided in the up-down direction.

In the above aspect, the first upper flange portion may be joined to the bracket by spot welding.

According to the above configuration, since the upper flange portion of the rocker outer is joined to the bracket by spot welding, it is possible to restrain the bracket to which the weld nut is attached from being detached and falling off from the rocker outer before the rocker outer and the rocker inner are bolted.

Since the upper flange portion of the rocker outer in welded to the bracket by spot welding, the upper flange portion of the rocker outer can be welded to the bracket efficiently.

In the above configuration, the spot welding may be performed at a plurality of positions.

According to the above configuration, the rocker outer is joined to the bracket by spot welding at the spot welding parts. Accordingly, in comparison with a case where the spot welding is performed only at one spot welding part, the number of spot welding parts is increased and it is possible to restrain relative rotation between the rocker outer and the bracket. Consequently, it is possible to improve joining strength between the rocker outer and the bracket.

In the above aspect, the first upper flange portion and the second upper flange portion may be bolted at a second bolting part which differs in position in the vehicle front-rear direction from the first bolting part; and the first flange portion may be welded to the bracket by spot welding at a position above a part between the first bolting part and the second bolting part.

In the above configuration, the first upper flange portion and the second upper flange portico may be bolted at a plurality of bolting parts including the first bolting part and the second bolting part, the plurality of bolting parts and the first bolting part and the second bolting part may be adjacent to each other in the vehicle front-rear direction among the plurality of bolting parts.

According to the above configuration, the spot welding part between the upper flange portion of the rocker outer and the bracket is provided at the position above the part between the bolting parts. Accordingly, the upper flange portion of the rocker outer can be welded to the bracket by avoiding the bolting parts, and the spot welding parts between the rocker outer and the rocker inner, the spot welding part being provided outward f the bolting parts in the vehicle front-rear direction (i.e., the spot welding parts to which a spot gun can reach so that spot welding is performable even if the front pillar inner is provided).

In the above aspect, the first upper flange portion may be provided in an upper end of the rocker outer and may extend in the vehicle front-rear direction and the second upper flange portion may be provided in an upper end of the rocker inner and may extend in the vehicle front-rear direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
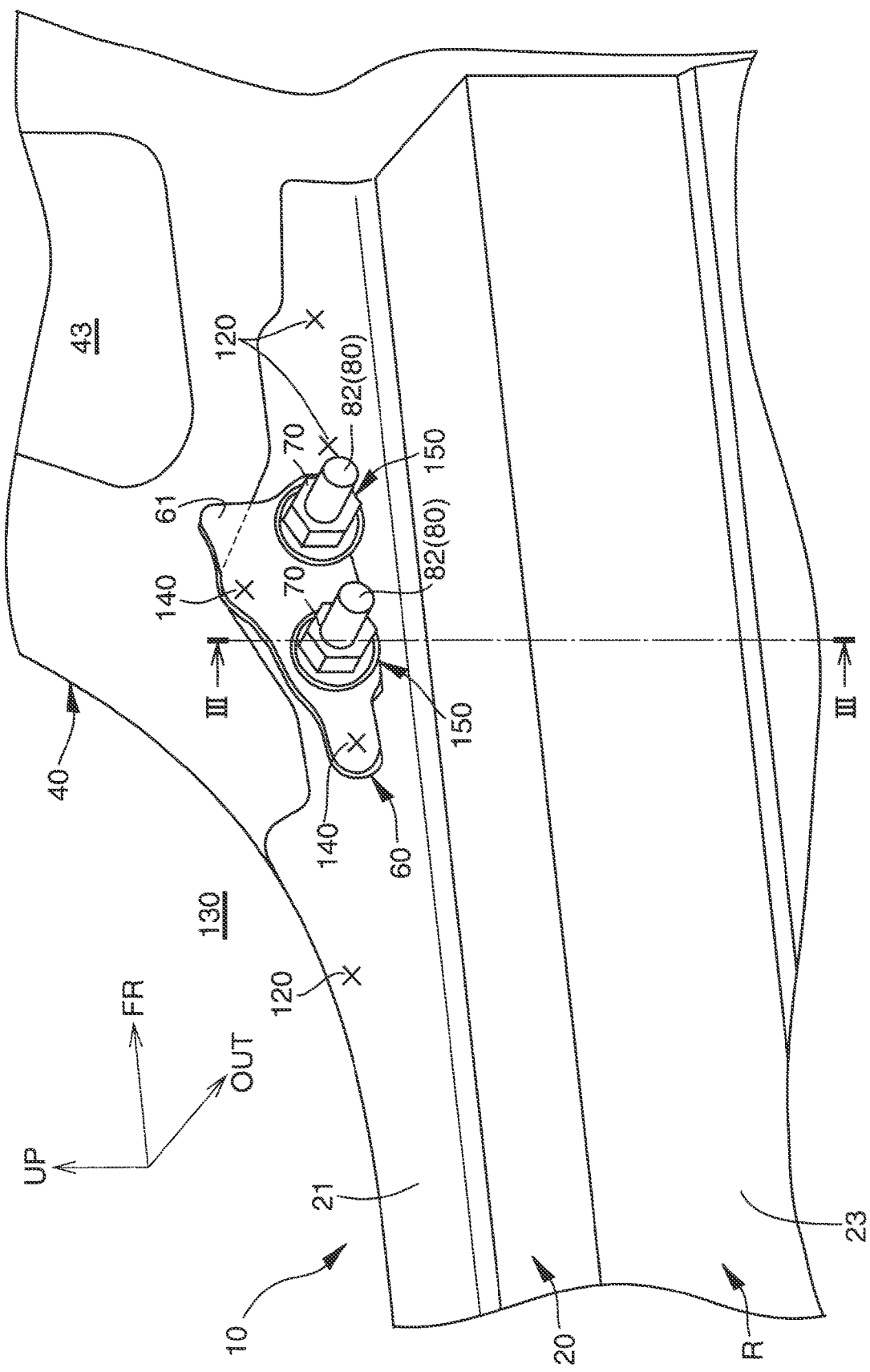
FIG. 1 is a perspective view of a rocker outer and its vicinity in a vehicle front structure of an embodiment of the disclosure when they are viewed from outside in the vehicle width direction.

A vehicle front structure 10 of an embodiment of the disclosure will be described with reference to the drawings.

Note that, in the drawings, UP indicates the upper side, FR indicates the front side in the vehicle front-rear direction, and OUT indicates the outer side in the vehicle width direction. Note that, in the following description, upper and lower sides indicate the upper and lower sides in the vehicle up-down direction and front and rear sides indicate the front and rear sides in the vehicle front-rear direction unless otherwise specified.

Figure 3:
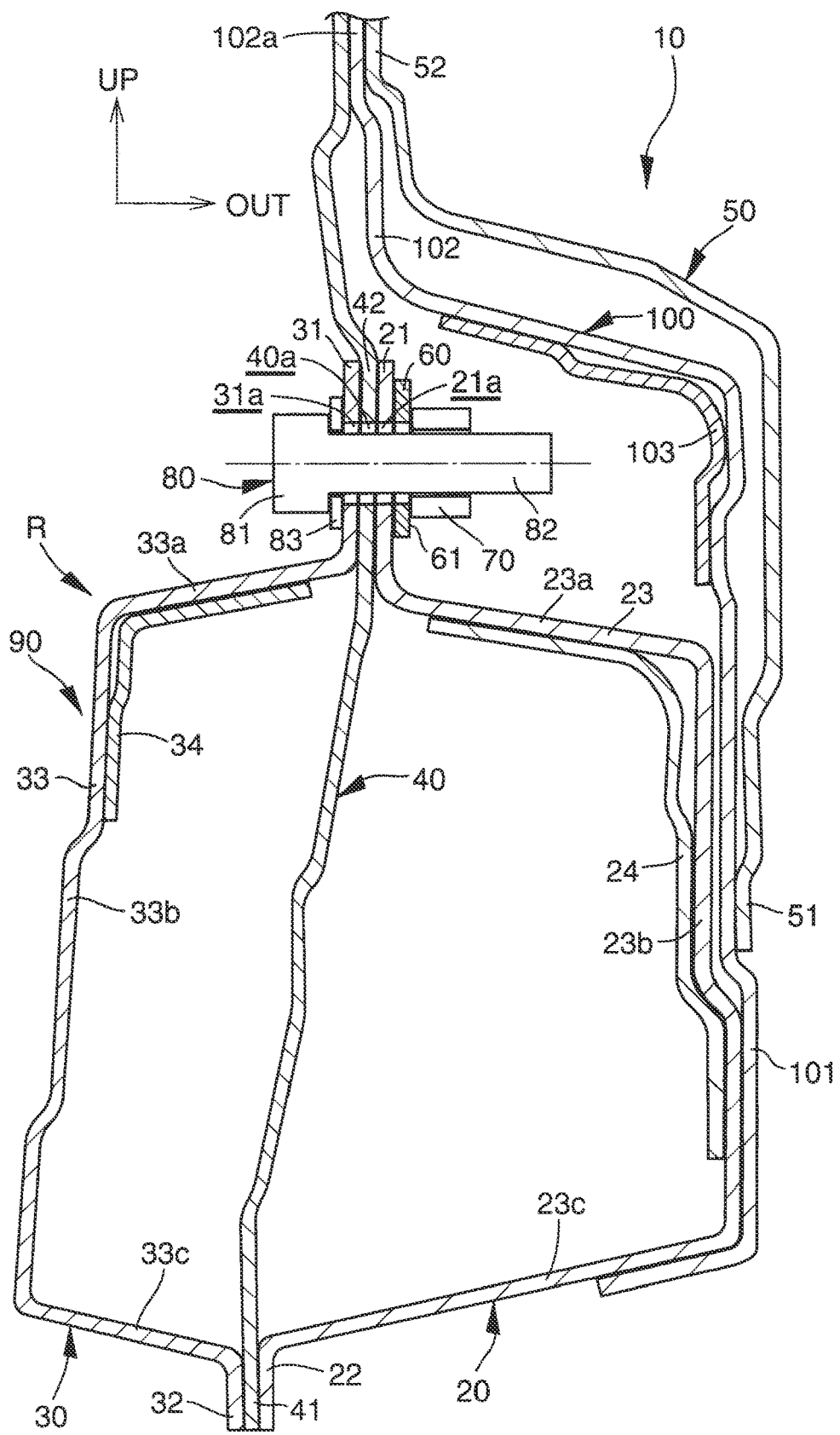
FIG. 3 is a sectional view in a part along a line III-III in FIG. 1 in the vehicle front structure of the embodiment of the disclosure (a bolt and a nut are illustrated schematically and a sectional view thereof is omitted for clarification of the drawing).

The vehicle front structure 10 of the embodiment of the disclosure includes a rocker outer 20, a rocker inner 30, a front pillar inner 40, a side member outer 50, a bracket 60, a weld nut 70, and a bolt 80, as illustrated in FIG. 3.

The rocker outer 20 and the rocker inner 30 are component parts of a rocker R as a frame member to be provided below each end of a vehicle in the width direction so as to extend in the front-rear direction. The rocker outer 20 and the rocker inner 30 are plate-shaped components with a thickness of around 1.2 mm. The rocker outer 20 and the rocker inner 30 are constituted by high tensile steel materials (including ultrahigh tensile steel materials), and are made of, for example, molten zinc plating steel sheets that are ultrahigh tensile steel materials with a tensile strength of 1180 Mpa. Note that the high tensile steel material is a high tensile steel plate, and the ultrahigh tensile steel material is an ultrahigh tensile steel plate. Since the rocker outer 20 and the rocker inner 30 are constituted by high tensile steel materials, it is possible to reduce the vehicle in weight and to achieve a high strength of the rocker R.

A sectional shape, of the rocker outer 20, that is perpendicular to the front-rear direction has a hat shape opened inward in the vehicle width direction. The rocker outer 20 includes an upper flange portion 21, a lower flange portion 22, and a swelling portion 23 provided between the upper flange portion 21 and the lower flange portion 22 so as to project outward in tire vehicle width direction. The swelling portion 23 includes an upper wall 23a bending from a lower end portion of the upper flange portion 21 so as to extend outward in the vehicle width direction, a side wall 23b bending from an outer end portion of the upper wall 23a in the vehicle width direction so as to extend downward, and a lower wall 23c bending from a lower end portion of the side wall 23b so as to extend inward in the vehicle width direction. Note that "bending" in the disclosure includes not only a case where bending is performed with a sudden angle change so that a fold line is formed, but also "curving" in which bending is performed without forming a fold line. An inner end portion of the lower wall 23c in the vehicle width direction is connected to an upper end portion of the lower flange portion 22.

In order to increase the rigidity of the rocker outer 20, the rocker outer 20 may be provided with a rocker outer reinforcement 24. The rocker outer reinforcement 24 is provided over the upper wall 23a and the side wall 23b of the swelling portion 23 and is joined to the upper wall 23a and the side wall 23b of the swelling portion 23.

A sectional shape, of the rocker inner 30, that is perpendicular to the front-rear direction has a hat shape opened outward in the vehicle width direction. The rocker inner 30 includes an upper flange portion 31, a lower flange portion 32, and a swelling portion 33 provided between the upper flange portion 31 and the lower flange portion 32 so as to project inward in the vehicle width direction. The swelling portion 33 includes an upper wall 33a bending from a lower end portion of the upper flange portion 31 so as to extend inward in the vehicle width direction, a side wall 33b bending from an inner end portion of the upper wall 33a in the vehicle width direction so as to extend downward, and a lower wall 33c bending from a lower end portion of the side wall 33b so as to extend outward in the vehicle width direction. An outer end portion of the lower wall 33c in the vehicle width direction is connected to an upper end portion of the lower flange portion 32.

In order to increase the rigidity of the rocker inner 30, the rocker inner 30 may be provided with a rocker inner reinforcement 34. The rocker inner reinforcement 34 is provided over the upper wall 33a and the side wall 33b of the swelling portion 33 and is joined to the upper wall 33a and the side wall 33b of the swelling portion 33.

Figure 2:
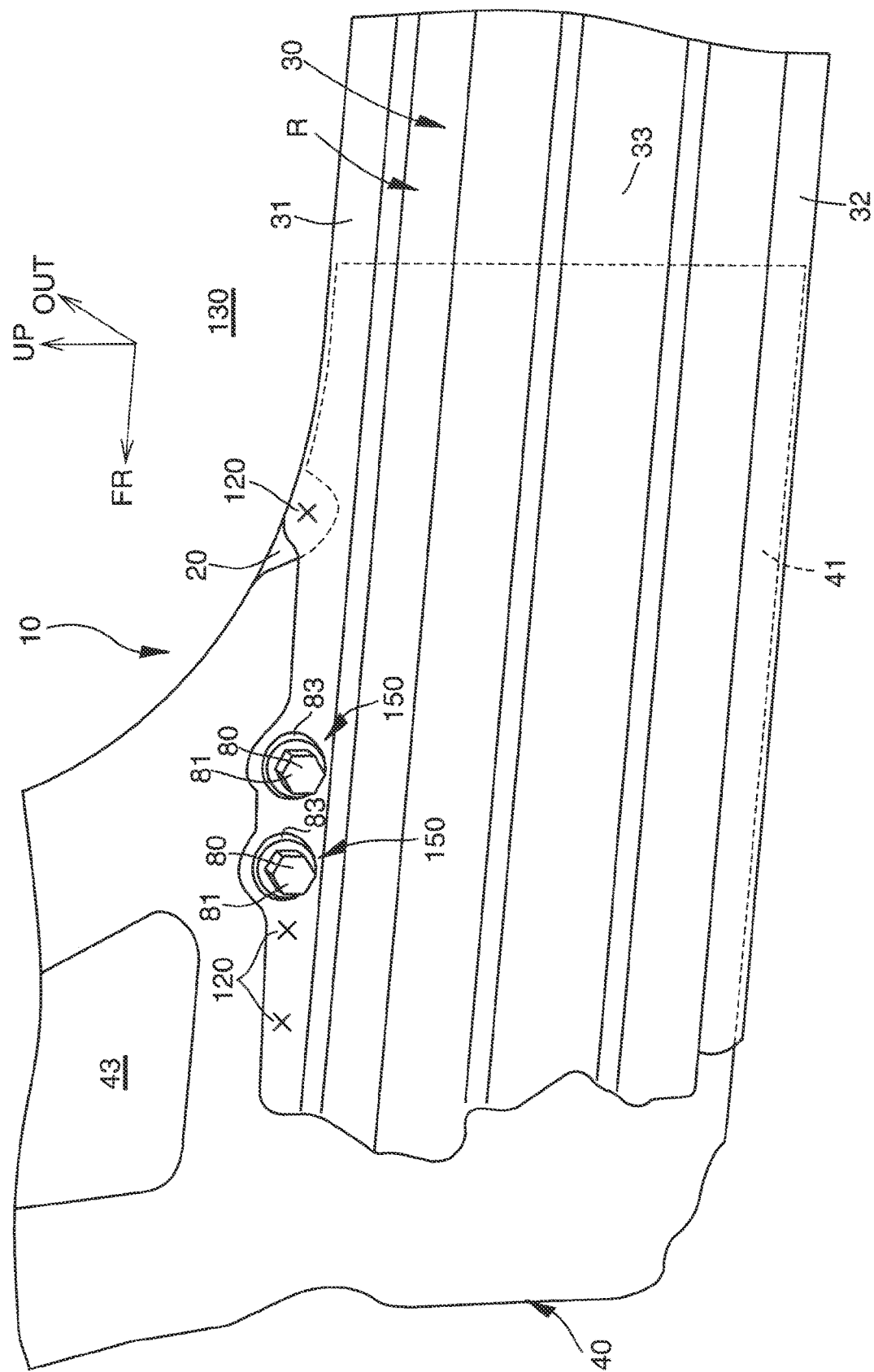
FIG. 2 is a perspective view of a rocker inner and its vicinity in the vehicle front structure of the embodiment of the disclosure when they are viewed from inside in the vehicle width direction.

As illustrated in FIGS. 1 and 2, the upper flange portion 31 of the rocker inner 30 is joined to the upper flange portion 21 of the rocker outer 20 by spot welding. Further, the lower flange portion 32 of the rocker inner 30 is joined to the lower flange portion 22 of the rocker outer 20 by spot welding. Hereby, a closed section portion 90 having a rectangular or hexagonal cross sectional shape is formed as the rocker R. Note that a reference sign 120 in FIGS. 1 and 2 indicates a spot welding part between the upper flange portions 21, 31 of the rocker outer 20 and the rocker inner 30.

The front pillar inner 40 is a plate-shaped component with a thickness of around 0.9 mm. The front pillar inner 40 is made of, for example, a molten zinc plating steel sheet that is a high tensile steel material with a tensile strength of 440 Mpa. The front pillar inner 40 is provided so as to extend in the up-down direction. The front pillar inner 40 is provided so as to extend upward from a front end of the rocker R and its vicinity. A door opening 130 where a front door (not shown) is placed is provided behind the front pillar inner 40 and above the rocker R. A through-hole 43 penetrating through the front pillar inner 40 in the vehicle width direction at a position above the rocker R is formed in an intermediate part of the front pillar inner 40 in the front rear direction.

As illustrated in FIG. 3, the front pillar inner 40 is configured such that a lower sandwiched portion 41 that is a lower end of the front pillar inner 40 and is provided at a position where it is sandwiched between the lower flange portions 22, 32 of the rocker outer 20 and the rocker inner 30 is joined to the lower flange portions 22, 32 and an upper sandwiched portion 42 provided at a position where it is sandwiched between the upper flange portions 21, 31 of the rocker outer 20 and the rocker inner 30 is joined to the upper flange portions 21, 31.

A front pillar outer 100 is provided outward of the rocker outer 20 and the front pillar inner 40 in the vehicle width direction. The front pillar outer 100 includes a lower part 101 extending along the side wall 23b and the lower wall 23c of the swelling portion 23 of the rocker outer 20, and an upper part 102 provided above the lower part 101. The front pillar outer 100 is joined, at the lower part 101, to the side wall 23b and/or the lower wall 23c of the swelling portion 23 of the rocker outer 20. Further, the front pillar outer 100 includes a sandwiched portion 102a provided in the upper part 102 so as to be sandwiched between the front pillar inner 40 and the side member outer 50, and is joined, at the sandwiched portion 102a, to the front pillar inner 40 and the side member outer 50. In order to increase the rigidity of the front pillar outer 100, the upper part 102 of the front pillar outer 100 may be provided with a front pillar outer reinforcement 103.

The side member outer 50 is an outer plate of the vehicle and is a design member. The side member outer 50 is placed outward of the rocker outer 20 and the front pillar outer 100 in the vehicle width direction. The side member outer 50 is joined, at a lower end 51, to the lower part 101 of the front pillar outer 100 and is joined, at a vertically intermediate part 52, to the sandwiched portion 102a of the front pillar outer 100.

The bracket 60 is a plate-shaped component with a thickness of around 1 mm and is a of component. The bracket 60 is a component different from the rocker outer 20. The bracket 60 has an intermediate property between the rocker outer 20 and the weld nut 70 in terms of tensile strength and melting temperature. For example, the bracket 60 is made of a cold rolled steel sheet having a tensile strength of 270 Mpa. The bracket 60 is joined to the upper flange portion 21 of the rocker outer 20 from outside in the vehicle width direction. As illustrated in FIG. 1, the bracket 60 is placed between the through-hole 43 of the front pillar inner 40 and the door opening 130 in the front-rear direction. Note that a part where the bracket 60 is placed is a part where spot welding between the upper flange portions 21, 31 of the rocker outer 20 and the rocker inner 30 cannot be performed because a spot gun (not shown) does not reach the part because of the front pillar inner 40.

The weld nut 70 is joined to an outer surface 61 of the bracket 60 in the vehicle width direction. The weld nut 70 is joined to the bracket 60, for example, by welding by crushing a projection (not shown) formed in the weld nut 70 by projection weld and the like. A plurality of weld nuts 70 is provided and an example illustrated herein shows a case where two weld nuts 70 are provided with distance in the front-rear direction.

The bracket 60 is joined to the upper flange portion 21 of the rocker outer 20 by spot welding in a state where the weld nuts 70 are welded thereto. Note that a reference sign 140 in FIG. 1 indicates a spot welding part between the bracket 60 and the upper flange portion 21 of the rocker outer 20. A plurality of spot welding parts 140 is provided. Note that, in the example illustrated herein, the spot welding parts 140 are provided at two positions, i.e., a position behind the weld nuts 70 and at an upper position between the weld nuts 70.

As illustrated in FIG. 3, the bolt 80 is inserted, from inside in the vehicle width direction, into holes 31a, 40a, 21a that are respectively provided in the upper flange portion 31 of the rocker inner 30, the front pillar inner 40, and the upper flange portion 21 of the rocker outer 20, and the bolt 80 is engaged threadedly with the weld nut 70. Hereby, the upper flange portions 21, 31 of the rocker outer 20 and the rocker inner 30 are bolted together.

The joining by use of the bolt 80 is performed in a state where welding is finished in the vehicle. That is, the joining by use of the bolt 80 is performed after the rocker outer 20, the rocker inner 30, the front pillar inner 40, the side member outer 50, the bracket 60, the weld nut 70, and the front pillar outer 100 are all welded.

A bolting part 150 where the bolt 80 is used for connection is provided at the same position as the weld nut 70, and thus, a plurality of bolting parts 150 (two bolting parts 150 in the example illustrated herein) is provided in the front-rear direction as illustrated in FIGS. 1 and 2. The bolt 80 includes a head 81 and a shaft portion 82. A washer 83 provided integrally with or separately from the bolt 80 is placed between the head 81 and the upper flange portion 31 of the rocker inner 30.

Next will be described operations and effects of the embodiment of the disclosure.

(A) In the embodiment of the disclosure, the weld nut 70 is not directly fixed to the rocker outer 20, but the weld nut 70 is fixed thereto via the bracket 60. Accordingly, it is not necessary to directly weld the weld nut 70 to the rocker outer 20. Accordingly, even in a case where the rocker outer 20 is constituted by a high tensile steel material, when the bracket 60 is set to have an intermediate property between the rocker outer 20 and the weld nut 70 in terms of tensile strength and melting temperature, it is possible to weld the weld nut 70 to the bracket 60 and to weld the bracket 60 to the rocker outer 20, so that the weld nut 70 can be fixed to the rocker outer 20. As a result, in a state where the side member outer 50 is placed outward of the rocker outer 20 in the vehicle width direction and the bolt 80 cannot be tightened from outside in the vehicle width direction, the bolt 110 can be tightened to the weld nut 70 fixed to the rocker outer 20, from inside in the vehicle width direction. Accordingly, even at a part that cannot be subjected to spot welding because a spot gun cannot reach the part due to the front pillar inner 40, the upper flange portions 21, 31 of the rocker outer 20 and the rocker inner 30 are bolted together, thereby making it possible to improve connection strength between the rocker outer 20 and the rocker inner 30.

(B) The bolting is performed at the bolting parts 150. Accordingly, in comparison with a case where the bolting is performed only at one bolting part 150, the number of bolting parts 150 is increased and it is possible to restrain relative rotation between the rocker outer 20 and the rocker inner 30. Consequently, it is possible to improve connection strength between the upper flange portion 21 of the rocker outer 20 and the upper flange portion 31 of the rocker inner 30. Further, the bolting parts 150 are provided in the vehicle front-rear direction. This is advantageous to improve the connection strength between the rocker outer 20 and the rocker inner 30 extending in the vehicle front-rear direction, in comparison with a case where the bolting parts 150 are provided in the up-down direction.

(C) Since the upper flange portion 21 of the rocker outer 20 is joined to the bracket 60 by spot welding, it is possible to restrain the bracket 60 to which the weld nut 70 is attached from being detached and falling off from the rocker outer 20 before the rocker outer 20 and the rocker inner 30 are bolted together.

(D) Since the upper flange portion 21 of the rocker outer 20 is welded to the bracket 60 by spot welding, the upper flange portion 21 of the rocker outer 20 can be welded to the bracket 60 efficiently.

(E) The rocker outer 20 is joined to the bracket 60 by spot welding at the spot welding parts 140. Accordingly, in comparison with a case where the spot welding is performed only at one spot welding part 140, the number of spot welding parts 140 is increased and it is possible to restrain relative rotation between the rocker outer 20 and the bracket 60. Consequently, it is possible to improve joining strength between the rocker outer 20 art the bracket 60.

(F) The spot welding part 140 between the upper flange portion 21 of the rocker outer 20 and the bracket 60 is provided above a part between the bolting parts 150 adjacent to each other in the front-rear direction. Accordingly, the upper flange portion 21 of the rocker outer 20 can be welded to the bracket 60 by avoiding the bolting parts 150 and the spot welding parts 120 between the rocker outer 20 and the rocker inner 30 the spot welding pasts 120 being provided outward of the bolting parts 150 in the vehicle front-rear direction (spot welding performed at a part where a spot gun reaches through the door opening 130 or the through-hole 43 so that spot welding is performable even if the front pillar inner 40 is provided).

(G) In the disclosure, the bolt and the nut are used for connection at the part that cannot be subjected to spot welding because a spot gun cannot reach the part. Accordingly, in comparison with a case where laser welding (so-called LSW (laser screw welding)) is performed on the upper flange portions 21, 31 of the rocker outer 20 and the rocker inner 30, the cost of equipment can be markedly reduced.

What is claimed is:

1. A vehicle front structure comprising:
   a rocker outer constituted by a high tensile steel material and extending in a vehicle front-rear direction, the rocker outer including a first upper flange portion;
   a rocker inner constituted by a high tensile steel material and extending in the vehicle front-rear direction, the rocker inner including a second upper flange portion;
   a front pillar inner extending in a vehicle up down direction and placed so as to be sandwiched between the rocker outer and the rocker inner;
   a side member outer placed outward of the rocker outer in a vehicle width direction; and
   a bracket joined to the first upper flange portion with a weld nut being fixed to the bracket, wherein
   the first upper flange portion and the second upper flange portion are bolted together at a First bolting part such that a bolt is inserted, from inside in the vehicle width direction, into respective holes provided in the second upper flange portion, the front pillar inner, and the first upper flange portion and is engaged with the weld nut.

2. The vehicle front structure according to claim 1, wherein
   the first upper flange portion and the second upper flange portion are bolted at a second bolting part which differs in position in the vehicle front-rear direction from the first bolting part.

3. The vehicle front structure according to claim 1, wherein
   the first upper flange portion is joined to the bracket by spot welding.

4. The vehicle front structure according to claim 3, wherein
   the spot welding is performed at a plurality of positions.

5. The vehicle front structure according to claim 1, wherein:
   the first upper flange portion and the second upper flange portion are bolted at a second bolting part which differs in position in the vehicle front-rear direction from the first bolting part; and
   the first flange portion is welded to the bracket by spot welding at a position above a part between the first bolting part and the second bolting part.

6. The vehicle front structure according to claim 5, wherein
   the first upper flange portion and the second upper flange portion are bolted at a plurality of bolting parts including the first bolting part and the second bolting part, the plurality of bolting parts and
   the first bolting part and the second bolting part are adjacent to each other in the vehicle front-rear direction among the plurality of bolting parts.

7. The vehicle front structure according to claim 1, wherein:
   the first upper flange portion is provided in an upper end of the rocker outer and extends in the vehicle front-rear direction; and
   the second upper flange portion is provided in an upper end of the rocker inner and extends in the vehicle front-rear direction.

* * * * *

UNITED STATES PATENT AND TRADEMARK OFFICE
CERTIFICATE OF CORRECTION

PATENT NO. : 10,836,434 B2
APPLICATION NO. : 16/160382
DATED : November 17, 2020
INVENTOR(S) : Kazuma Otoguro and Jumpei Nishide It is certified that error appears in the above-identified patent and that said Letters Patent is hereby corrected as shown below:

On the Title Page

Item (71), applicant 1, city, delete "Toyota" and insert --Toyota-shi Aichi-ken--, therefor.

Item (72), inventor 1, city, delete "Toyota" and insert --Toyota-shi Aichi-ken--, therefor.

Item (72), inventor 2, city, delete "Nisshin" and insert --Nisshin-shi Aichi-ken--, therefor.

Item (73), assignee 1, city, delete "Toyota" and insert --Toyota-shi Aichi-ken--, therefor.

In the Specification

In Column 1, Line(s) 23, after "vehicle", insert --,--.

In Column 1, Line(s) 60, after "is", delete ",".

In Column 6, Line(s) 5, before "component", delete "of" and insert --one-part--, therefor.

In the Claims

In Column 8, Line(s) 14, Claim 1, delete "up down" and insert --up-down--, therefor.

In Column 8, Line(s) 22, Claim 1, delete "First" and insert --first--, therefor.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*